Patented Apr. 24, 1945

2,374,193

UNITED STATES PATENT OFFICE 2,374,193

PREPARATION OF ORGANIC SULPHONATES

Henry M. Grubb and Elton B. Tucker, Highland, Ind., assignors to Standard Oil Company, Chicago, Ill., a corporation of Indiana No Drawing. Application June 30, 1942, Serial No. 449,160

13 Claims. (Cl. 260—513)

This invention relates to improvements in the preparation of hydrocarbon sulphonyl chlorides and sulphonates and more particularly to the preparation of hydrocarbon sulphonyl chlorides and sulphonates in the absence of light by the use of organic peroxides.

It is known to prepare hydrocarbon sulphonyl chlorides particularly from aliphatic hydrocarbons and the higher alkyl monocyclic aromatic hydrocarbons by reacting the same with sulphuryl chloride in the presence of certain organic nitrogen compounds and light. Kharasch and Read (Journal of the American Chemical Society, volume 61, (1939), 308-9, describe the sulphonation of aliphatic hydrocarbons and higher alkyl monocyclic hydrocarbons with sulphuryl chloride in the presence of light using as catalyst certain organic nitrogen compounds, the most effective being the aromatic nitrogen ring compounds such as pyridines and quinolines. In general, organic nitrogen compounds, except those compounds which are bromination and oxidation inhibitors, for example, diphenyl amine, paraphenylenediamine, etc., can be used with varying degrees of effectiveness. The reaction of these hydrocarbons with sulphuryl chloride in the presence of these organic nitrogen compounds and light favors the formation of hydrocarbon sulphonyl chloride, which can be converted to the sulphonates by hydrolysis.

In another type of reaction hydrocarbon sulphonates can be obtained by reacting suitable hydrocarbons with a gaseous mixture of sulphur dioxide and chlorine in the presence of light, and subsequently hydrolyzing the reaction product to obtain the corresponding sulphonates. The sulphonation of hydrocarbons by treatment with gaseous mixtures of sulphur dioxide and chlorine is described in United States Patents Nos. 2,263,312, 2,197,800, Re. 20,968 and 2,202,791.

The use of strong illumination required in the above reactions presents several difficulties and disadvantages when the reactions are carried out in commercial size reactors. In some cases the reaction mixture darkens during the process and catalysis by light of the darkened reactants becomes difficult or impossible. There are also some hazards involved in the use of strong illumination particularly when inflammable solvents are employed in the process.

It is an object of the present invention to provide a method of accelerating the reaction between hydrocarbons and sulphuryl chloride or a gaseous mixture of sulphur dioxide and chlorine in the absence of light. Another object of the invention is to provide an improved method of preparing hydrocarbon sulphonyl chlorides and/or sulphonates without the necessity of providing illumination for catalyzing the reaction.

A further object of the invention is to provide an improved and rapid method of preparing hydrocarbon sulphonyl chlorides and hydrocarbon sulphonates by reacting suitable hydrocarbons with a sulphuryl chloride or a gaseous mixture of sulphur dioxide and chlorine in the absence of light.

Other objects and advantages of the present invention will become apparent as the description thereof proceeds.

We have discovered that the foregoing objects can be attained by carrying out reactions of the foregoing types in the presence of organic peroxides in the absence of light. Thus in the sulphonation of hydrocarbons with sulphuryl chloride employing suitable organic nitrogen compounds as catalysts, the reaction can be effected in the dark by adding a small amount of an organic peroxide to the reaction mixture. As stated above, organic nitrogen compounds, except those which are bromination and oxidation inhibitors, are suitable as catalysts, for example, aromatic nitrogen ring compounds such as pyridines and quinolines, and aliphatic amines such as triethylene tetramine, amylamines, etc. Aliphatic or aromatic peroxides such as benzoyl peroxides, lauroyl peroxides, phthalyl peroxides and the like can be employed.

The hydrocarbon used in the reaction should be substantially free of polycyclic aromatic hydrocarbons and organic sulphur compounds such as mercaptans and organic sulphides since we have found that their presence materially decreases the yield of the desired hydrocarbon sulphonyl chloride or the hydrocarbon sulphonate. Suitable hydrocarbon starting materials are therefore the aliphatic hydrocarbons, the alicyclic hydrocarbons, or the higher alkyl monocyclic aromatic hydrocarbons. Hydrocarbon mixtures which are predominantly paraffinic or aliphatic, such as petroleum oil fractions ranging from liquefied normally gaseous hydrocarbons such as propane and butane to heavier hydrocarbons such as oil fractions having viscosities ranging from about 50 to about 75 seconds and up to about 800 or more seconds Saybolt Universal at 100° F. can be employed.

When petroleum oil fractions are used as a starting material it is preferable that the same be refined in order to obtain a product which is substantially free of polycyclic aromatics and sulphur compounds. Such refining treatments include treatment with concentrated or fuming sulphuric acid and/or extraction with suitable solvents such as Chlorex, liquefied $SO_2$, furfural, phenol, liquefied normally gaseous hydrocarbons such as propane and butane, nitrobenzene, nitromethane and other known suitable solvents.

The temperature at which the reaction is conducted is preferably maintained between about 100° F. and 200° F., and under a pressure sufficient to maintain the reactants in the liquid phase. The amounts of tertiary nitrogen base and of the organic peroxide employed may be from about 0.01% to about 1% of the hydrocarbon or hydrocarbon mixture employed. The relative amount of sulphonating agent to the hydrocarbon or hydrocarbon mixture undergoing sulphonation on a molal basis is within the range of from about 0.25 to about 10.0, depending on whether it is desired to produce monosulphonates or polysulphonates, and also depending on the efficiency with which the sulphonating reagents produce sulphonates. For example, sulphonation of a certain oil until an average of 1.5 sulphonyl groups per hydrocarbon molecule have been introduced appears to produce a maximum yield of disulphonate, together with monosulphonate and higher polysulphonates, while some of the oil remains unsolphonated.

In preparing the hydrocarbon sulphonyl chloride the hydrocarbon or hydrocarbon mixture is mixed with the required amount of the organic nitrogen compound and the peroxide, and the sulphonating agent such as the sulphuryl chloride introduced into the mixture, which is maintained at a temperature within the range of from about 100° F. to about 200° F. with vigorous agitation, care being taken to add the sulphonating agent in small increments over the reaction period. The reaction may be carried out in the presence of an inert solvent such as benzene or carbon tetrachloride or other extensively chlorinated hydrocarbons.

The invention will be further illustrated by the following examples:

Example I

One hundred forty grams of a highly refined mineral oil having a viscosity of about 70 seconds Saybolt Universal at 100° F. were placed in a flask from which light was excluded, together with 0.15 gram of pyridine and 0.25 gram of benzoyl peroxide, the mixture heated to about 175° F. and 30 grams of sulphuryl chloride added dropwise to the heated mixture over a period of about one hour while agitating the solution. The reaction mixture was then treated with concentrated sodium hydroxide to convert the hydrocarbon sulfonyl chloride to the sulfonate, which was extracted with aqueous alcohol. A yield of 22.3 grams of the alcohol-free sulphonate was obtained.

Example II

A catalytic cycle stock boiling within the range of about 400° F. to about 700° F. was freed of aromatics by extraction with nitromethane at a temperature of about 200° F. to 212° F., and an extract phase comprising substantially polycyclic and monocyclic aromatic hydrocarbons, and a raffinate phase comprising substantially paraffinic hydrocarbons obtained. The raffinate phase was stripped of nitromethane and fractionated to remove the fraction boiling above about 500° F., was then treated in the absence of light at a temperature of 120–150° F. with sulphuryl chloride in the presence of pyridine and benzoyl peroxide, the sulphuryl chloride being added in small increments over a period of about one-half hour. The reaction was completed in about ten minutes after the last portion of the sulphuryl chloride was added. The hydrocarbon sulphonyl chloride obtained was converted to the sulphonate by hydrolysis with sodium hydroxide at a temperature within the range of from 150–275°, the sulphonate then extracted with alcohol in aqueous solution such as 60% alcohol solution, separated from the supernatant oil, and subsequently stripped of the alcohol.

In the above example the nitromethane extract phase containing the polycyclic and monocyclic aromatics may be cooled to a temperature of 20–50° F. to bring about the separation of monocyclic aromatics from the polycyclic aromatics. The former may be treated with sulphuryl chloride in the presence of pyridine, or other similar tertiary nitrogen base, and an organic peroxide, to form the corresponding sulphonyl chloride, which may then be hydrolyzed to the sulphonate. If desired, the separated monocyclic aromatics may be combined with the nitromethane raffinate and treated together therewith as above described.

The above sulphonations can be accomplished in the dark by bubbling a mixture of gaseous sulphur dioxide and chlorine through the hydrocarbon material, which is maintained in a liquid phase and which contains a small quantity of an organic peroxide, such as, for example, benzoyl peroxide. After about 25–75% of the hydrocarbon material has reacted the passage of the gaseous mixture is stopped and the reaction mixture blown with air to remove HCl and unreacted sulphur dioxide and chlorine. The reaction product comprising substantially hydrocarbon sulphonyl chlorides and some unreacted hydrocarbon together with some chlorinated hydrocarbon and chlorosulphonyl chlorides can be converted to the sulphonates by reaction with strong alkali solutions.

Example III

A mixture of $SO_2$ and $Cl_2$ gases (approximately 2:1 volume ratio) was bubbled into 140 grams of a highly refined oil at 131° F. Light was excluded and benzoyl peroxide (about 1 gram) was added incrementally. A yield of 16 grams of 100% soap was obtained on hydrolysis of the sulphonyl chlorides.

Example IV

Under conditions substantially identical with those given in Example III, except that no peroxide was used, a yield of 5.1 grams of pure soap was produced.

Example V

A mixture of $SO_2$ and $Cl_2$ gases (approximately 2:1 ratio) was bubbled into 140 grams of cetane at 138° F. until a weight gain of 20.5 grams resulted. Light was excluded and about 0.75 gram of benzoyl peroxide was added incrementally during the course of the reaction. A yield of 32.8 grams of sodium cetyl sulphonate resulted from hydrolysis of the sulphonyl chlorides with strong caustic. This represents an efficiency of about 64% in utilization of $Cl_2$ based on the amount of $Cl_2$ reacting.

Instead of hydrolyzing the hydrocarbon sulphonyl chlorides with sodium hydroxide solutions other alkali metal hydroxides such as potassium hydroxide can be used, as well as the alkaline earth hydroxides and oxides. The alkaline earth sulphonates can be obtained by hydrolyzing the sulphonyl chloride with an alkaline earth hydroxide or oxide, or the alkali metal sulphonate can be treated with an alkaline earth oxide or chloride, and the alkaline earth sulphonate obtained. For example, the alcoholic solution of sodium sulphonate can be treated with lime or with calcium chloride to obtain the corresponding calcium sulphonate.

The preparations of sulphonates from sulphonyl chlorides obtained by treating hydrocarbons or hydrocarbon mixtures in the absence of light with a mixture of gaseous SO2 and Cl2, in the presence of an organic peroxide as above described, is also well adapted to similar treatment of certain other liquid organic compounds or organic compounds capable of being readily liquefied, such as ethers and monocarboxylic acids other than formic and acetic acid.

The sulphonates obtained by the foregoing described process are suitably employed as surface-active agents, such as detergents, wetting agents, etc.

The method of sulphonating organic compounds of the type herein described by reacting the same in the dark with a mixture of gaseous SO2 and Cl2 in the presence of an organic peroxide is being claimed in our copending divisional application Serial No. 542,241 filed June 26, 1944.

While the present invention has been described in connection with certain specific embodiments thereof, it is to be understood that it is not intended that the same shall be limitative of the scope of the invention except insofar as included in the accompanying claims.

We claim:

1. The process of sulphonating an organic compound selected from the class consisting of aliphatic hydrocarbons, alicyclic hydrocarbons and higher aklyl monocyclic aromatic hydrocarbons comprising reacting said organic compound with sulphuryl chloride in the dark in the presence of an organic peroxide and an organic nitrogen compound selected from the class consisting of an aromatic nitrogen ring compound and an aliphatic amine.

2. The process of sulphonating an organic compound as described in claim 1 in which the organic nitrogen compound is pyridine.

3. The method of sulphonating hydrocarbons selected from the class consisting of aliphatic hydrocarbons, alicyclic hydrocarbons, higher alkyl monocyclic aromatic hydrocarbons and mixtures thereof, comprising reacting said hydrocarbons in the absence of light with sulphuryl chloride in the presence of small amounts of organic peroxide and an organic nitrogen compound selected from the class consisting of an aromatic nitrogen ring compound, and an aliphatic amine, whereby hydrocarbon sulphonyl chlorides are formed, and subsequently hydrolyzing said hydrocarbon sulphonyl chlorides with a basic hydrolyzing agent.

4. The process of sulphonating an organic compound as described in claim 1 in which the organic peroxide is an aromatic peroxide.

5. The process of sulphonating an organic compound as described in claim 1 in which the organic peroxide is a benzoyl peroxide.

6. The process of sulphonating an organic compound as described in claim 1 in which the organic peroxide is an aliphatic peroxide.

7. The process of sulphonating an organic compound as described in claim 1 in which the organic peroxide is lauroyl peroxide.

8. The process comprising reacting, in the absence of light, a hydrocarbon mixture predominating in aliphatic hydrocarbons with sulphuryl chloride in the presence of pyridine and an organic peroxide.

9. The process described in claim 3 in which the organic nitrogen compound is pyridine, the organic peroxide is benzoyl peroxide and the hydrolyzing agent is an alkali metal hydroxide.

10. The process described in claim 3 in which the hydrolyzing agent is sodium hydroxide.

11. The process described in claim 3 in which the hydrolyzing agent is an alkaline earth hydroxide.

12. The process described in claim 3 in which the hydrolyzing agent is calcium hydroxide.

13. The process of sulphonating an organic compound selected from the class consisting of aliphatic hydrocarbons, alicyclic hydrocarbons and higher alkyl monocyclic aromatic hydrocarbons comprising reacting in the liquid phase said organic compound with sulphuryl chloride at a temperature of from about 100° F. to about 200° F. in the dark in the presence of from about 0.01% to about 1% of an organic peroxide and from about 0.01% to about 1% of an organic nitrogen compound selected from the class consisting of an aromatic nitrogen ring compound and an aliphatic amine.

HENRY M. GRUBB.
ELTON B. TUCKER.